United States Patent [19]
Nathan

[11] Patent Number: 5,335,856
[45] Date of Patent: Aug. 9, 1994

[54] AIR BOOM SPRAYER TRAILER HITCH AND SUSPENSION

[75] Inventor: Micha Nathan, Pardess-Hanna, Israel

[73] Assignee: FMC Corporation, Chicago, Ill.

[21] Appl. No.: 959,831

[22] Filed: Oct. 13, 1992

[51] Int. Cl.$^5$ .................... A01B 59/00; B05B 1/20
[52] U.S. Cl. .................... 239/164; 239/172; 280/43.23; 280/446.1; 280/455.1; 172/324; 172/679
[58] Field of Search ............ 239/159, 164, 172, 176, 239/655; 280/43, 43.17, 43.22, 43.23, 446.1, 447, 448, 455.1; 172/278, 318, 317, 324, 400, 483, 484, 614, 615, 661, 679

[56] References Cited

U.S. PATENT DOCUMENTS

| | | | |
|---|---|---|---|
| 4,043,403 | 8/1977 | Anderson et al. | 280/43.23 |
| 4,180,133 | 12/1979 | Collogan et al. | 172/679 |
| 4,420,169 | 12/1983 | Taylor | 280/446.1 |
| 4,681,335 | 7/1987 | Ledermann et al. | 280/446.1 |
| 4,838,358 | 6/1989 | Freudendahl | 172/324 |
| 5,098,018 | 3/1992 | Hadar et al. | 239/176 |

FOREIGN PATENT DOCUMENTS

| | | | |
|---|---|---|---|
| 611662 | 1/1961 | Canada | 172/318 |
| 1197671 | 7/1965 | Fed. Rep. of Germany | 239/176 |
| 664588 | 5/1979 | U.S.S.R. | 280/446.1 |
| 2125672 | 3/1984 | United Kingdom | 172/324 |
| 2181398 | 4/1987 | United Kingdom | 280/455.1 |

*Primary Examiner*—Karen B. Merritt
*Attorney, Agent, or Firm*—Ronald C. Kamp; R. B. Megley

[57] ABSTRACT

A trailer mounted sprayer having an air boom supported from the trailer frame by a four-bar linkage movable by a hydraulic cylinder to adjust the elevation of the boom and with ground-engaging wheels rotatably attached to bell cranks mounted on the frame and pivotable by cylinders to control the ground clearance. Accumulators isolate the frame from shock loads created as the wheels traverse uneven ground and also isolate the boom from shock loads that would otherwise be transmitted from the frame to the boom. A draft member pinned to both the trailer and to the tractor pulling the trailer has hydraulic jacks to determine which of the pinned connections will control the pivotal movement between the tractor and the trailer.

8 Claims, 2 Drawing Sheets

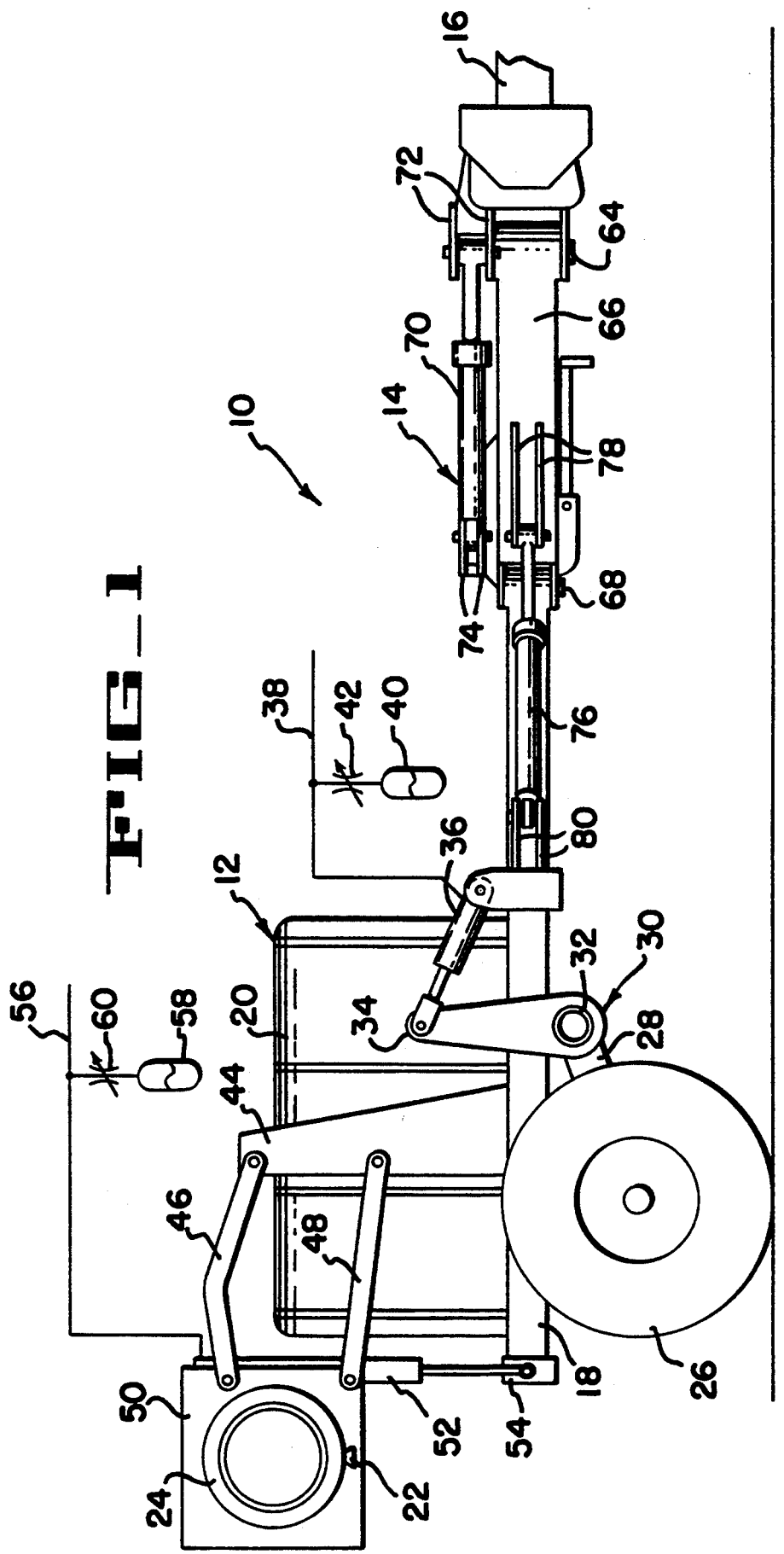

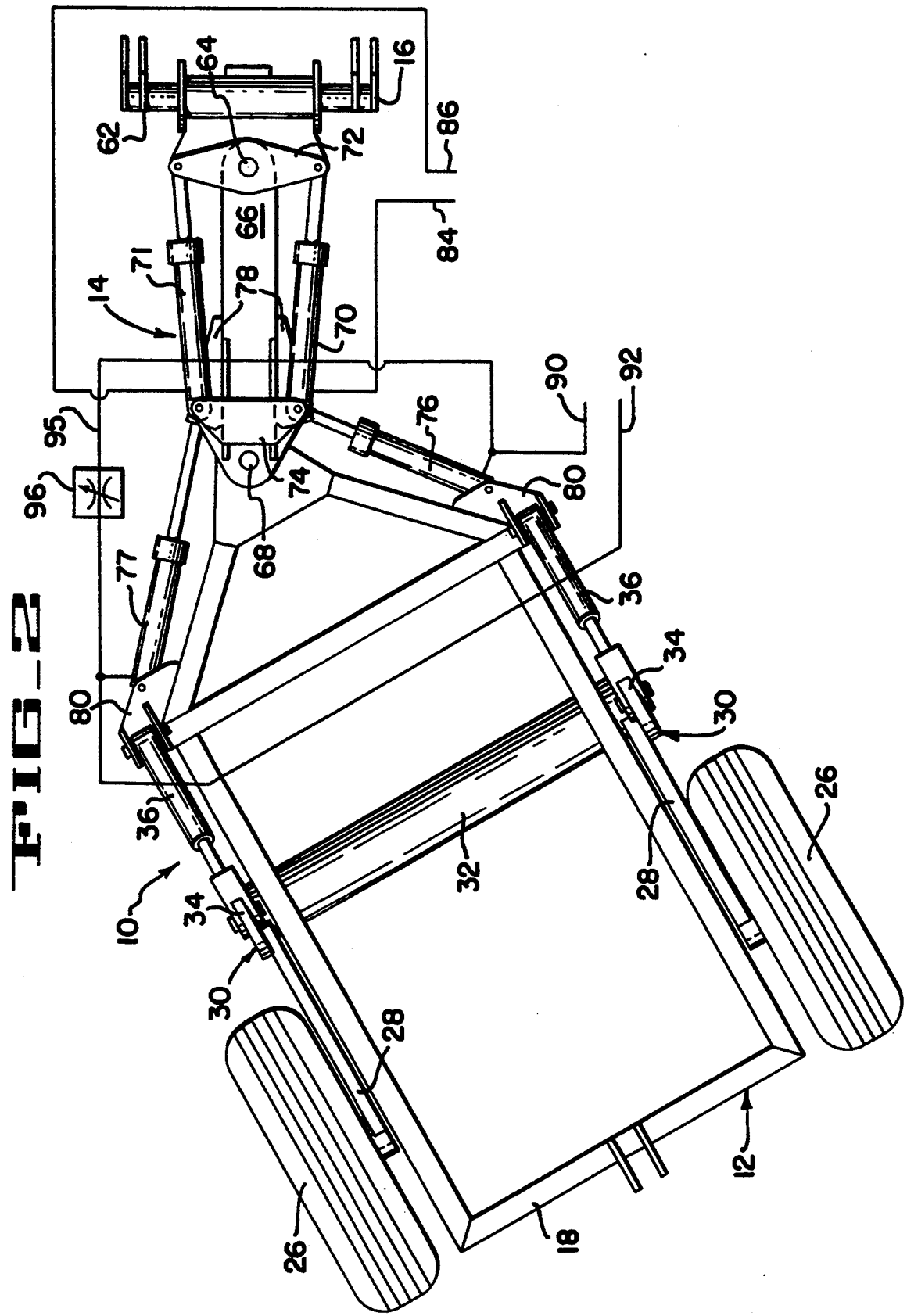

AIR BOOM SPRAYER TRAILER HITCH AND SUSPENSION

This invention relates to agricultural sprayers, generally, and more particularly, to such sprayers which are of the air boom type.

The recent development of air boom sprayers continues the effort to improve agricultural yields by effective and economical control of insects, fungi and the like. The use of an air boom mounted on a trailer drawn by a conventional farm tractor introduces problems not encountered when the air boom is directly mounted on a tractor or on a high clearance carrier. Among those problems is tracking, i.e., assuring the wheels of the trailer accurately follow the path of the wheels of the tractor, to avoid damage to the plants during turns. The necessity of providing sufficient clearance for crops of various heights, while permitting the air boom and the spray nozzles to be positioned at the proper elevation for efficient and effective dispersal of the liquid must also be addressed, as must the need for a low center of gravity for the trailer unit during transport to and from, and between, fields. A trailer mounted air boom may also have the tendency to "fish tail" during high speed transport, and hence a means to minimize such a tendency is highly desirable. Due to the nature of air booms, it is also desirable to provide means to isolate, and thus protect, the air boom from the shocks created by traversing rough terrain. The down-slope wander of a trailer when operated across a hill side would also result in damage to crops and means to compensate for or prevent such wander is highly desirable.

The present invention provides a trailer unit for an air boom type sprayer which addresses the problems and possesses the desirable attributes mentioned above. These and other advantages of this invention, and many of the attendant advantages thereof, will become more readily apparent from a perusal of the following description of a preferred embodiment and the accompanying drawings, wherein:

FIG. 1 is a side elevational view of a trailer unit, with portions of the hydraulic circuit shown schematically, according to the present invention, and FIG. 2 is a top plan view, with portions thereof eliminated for clarity, of the trailer unit shown in FIG. 1.

Referring now to FIG. 1, there is shown a trailer unit, indicated generally at 10, which includes a trailer 12 having a draw-bar arrangement 14 connectable to a conventional three point hitch 16 of a farm tractor (not shown). The trailer 12 includes a frame 18, which carries a tank 20 and associated equipment (not shown), for pumping liquid from the tank to the spray nozzles 22 on the air boom 24. A wheel 26 is rotatably mounted on one arm 28 of each of a pair of bell cranks 30, which are rotatably mounted on each end of a cross-tube 32 attached to and extending across the under side of the frame 18. The other arms 34 of the bell cranks 30 are pivotally attached to the rod end of a hydraulic cylinder 36, the head end of which is pivotally pinned to a bracket secured to the frame 18. Extension and retraction of the cylinders 36 will cause the frame 18 to be respectively raised and lowered relative to the ground. Extension of the cylinders 36 may be controlled by directing hydraulic fluid under pressure from the tractor through conduit 38. The hydraulic cylinder 36 may be single-acting since the weight of the frame 18 and the material supported thereon will force the cylinders 36 to retract when the conduit 38 is connected to the reservoir. Blocking the conduit 38 will hydraulically lock the cylinders 36 to maintain a desired ground clearance.

An accumulator 40 is hyraulically connected with the conduit 38 through a variable orifice 42, which permits the wheels 26 to traverse rough terrain while reducing the shock loads transmitted to the frame 12 and hence to the air boom 24. This mounting of the wheels 26 to the frame 18 and the associated hydraulic circuitry permits the tractor operator to adjust the clearance of the trailer to accommodate crops of various heights, while also providing a hydraulic suspension to isolate the air boom 24 from the shock loads created by rough terrain. The cylinders 36 may also be completely retracted to achieve a low center of gravity for stable and safe transport at high speed.

A pair of upright posts 44 are attached to the frame 18, one on each side of the tank 20. A pair of links 46 and 48 are attached at one end to each post 44 and at the other end to the central structure 50 of the air boom 24. Each pair of links 46 and 48 function, with the associated post 44 and the central structure 50, as a four-bar linkage to permit the boom 24 to vary its vertical position while maintaining a constant orientation so that the nozzles 22 are always properly directed. A single hydraulic cylinder 52 has its rod end pivotally connected to a bracket 54 and its head end pivotally connected to the central structure 50, although such connection may also be to a cross member secured between the upper links 46. Extension of the cylinder 52 will elevate the boom 24 relative to the frame 18 and retraction will lower it. Because the weight of the boom 24 will always urge the cylinder 52 to retract, this cylinder may also be single acting. A conduit 56 is hydraulically connected to the head end of the cylinder 52 and is connected to the reservoir, in a conventional manner through a valve on the tractor, to permit the cylinder 52 to retract. Connecting the conduit 56 to hydraulic pressure will cause the cylinder 52 to extend and blocking the conduit 56 will hold the air boom at a desired elevation relative to the frame. The cylinder 52 permits the tractor operator to adjust the vertical position of the boom 24 to permit effective and efficient distribution of liquid spray from nozzles 22 as required for any particular crop regardless of the ground clearance provided by adjustment of the bell crank 30.

An accumulator 58 is hydraulically connected to the conduit 56 with a variable orifice 60 interposed therebetween. The accumulator 58 acts as a hydraulic spring, in a manner similar to accumulator 40, to further cushion the boom 24 from the shock loads created by the wheels 26 traversing rough terrain.

As will be better seen in FIG. 2, the draw-bar arrangement, indicated generally at 14, includes a tool bar member 62, which is capable of connection to the three point hitch of a conventional farm tractor. The member 62 is pivotally connected by pin 64 to a draft member 66, which member is in turn pivotally connected by pin 68 to the frame 18 of the trailer 12. A forward pair of cylinders 70 and 71 are pivotally connected at their rod ends to plates 72 secured to bar member 62 on each side of the pin 64 and at their head ends to brackets 74 secured to the draft member 66.

A rearward pair of cylinders 76 and 77 are pivotally connected at their rod ends to brackets 78 secured to each side of the draft member 66 and at their head ends to brackets 80 secured to the frame 18 of the trailer 12. The pivotal connections of the rod ends of the cylinders 76 and 77 to the brackets 78 are vertically aligned with the pivotal connections of the head ends of the cylinders 70 and 71 to brackets 74. The forward pair of cylinders 70 and 71 are hydraulically connected at their head ends with conduits 84 and 86. When both of the conduits are blocked the cylinders 70 and 71 are hydraulically locked, thus preventing any pivotal movement between the tool bar member 62 and the draft member 66. Interconnecting the conduits 84 and 86 permits free relative movement between the tool bar member 62 and the draft member, thus permitting the trailer 12 to follow the tractor by pivoting about pin 64. Directing hydraulic pressure through conduit 84 while connecting the conduit 86 with the reservoir will cause the cylinder 70 to extend and the cylinder 71 to retract, and the opposite extension and retraction will occur when the conduit 86 is pressurized while conduit 84 is connected with the reservoir.

The hydraulic adjustment of the relative lengths of the cylinders 70 and 71 permits an angular off-set of the trailer 12 relative to the tractor to preclude down hill wander while working on slopes.

The rearward hydraulic cylinders 76 and 77 have conduits 90 and 92 connected to their respective head ends. When "steering" is desired about the pin 64, both of the conduits 90 and 92 are blocked while the conduits 84 and 86 are interconnected, and when steering is desired about the pin 68 the conduits 90 and 92 are interconnected while the conduits 84 and 86 are blocked. Hydraulic adjustment of the relative lengths of the cylinders by selective pressuring of one of the conduits 90 and 92 while connecting the other with the reservoir will also permit angular off-set to compensate for down hill wander.

Conventional valves on the tractor are provided to create the conditions described above for the conduits 84 and 86, and 90 and 92. In order to minimize fish tailing of the trailer, a conduit 95 with an adjustable orifice 96 interposed therein connects the head ends of the cylinders 76 and 77. By making the distance from the pin 68 to the axis of rotation of the wheels 26 equal to the distance from the pin 68 to the axis of rotation of the rear wheels of the tractor, the wheels of the trailer will accurately follow the tractor wheels when the forward cylinders 70 and 71 are locked and the rearward cylinders 76 and 77 are interconnected for steering about pin 68.

While a preferred embodiment of the present invention has been shown and described herein, it will be appreciated that various changes and modifications may be made therein without departing from the spirit of the invention as defined by the scope of the appended claims.

What is claimed is:

1. A tractor-drawn trailer having an air boom including a central structure for spraying liquid on a crop, comprising:
    a frame having lateral sides;
    a tank for said liquid mounted on said frame;
    a pair of bell cranks, each of which has an actuating arm and a wheel-supporting arm, pivotally connected to said frame, one of said pair of bell cranks being positioned on each of said lateral sides of said frame;
    a ground-engaging wheel rotatively mounted on each of said wheel-supporting arms;
    first hydraulic cylinders connected between said frame and said actuating arms for raising and lowering said frame relative to the ground;
    first accumulator means communicating with said first hydraulic cylinders to isolate said frame from shock loads resulting from said wheels traversing uneven ground;
    a pair of upright posts mounted on said frame;
    a pair of links pivotally connected to each of said posts and to said central structure;
    a second hydraulic cylinder connected between said frame and said air boom to raise and lower said air boom relative to said frame;
    and a second accumulator means communicating with second hydraulic cylinder to isolate said boom from shock loads imposed on said frame.

2. The invention according to claim 1 and further comprising:
    a draft member;
    first pin means for pivotally connecting said draft member to said frame;
    a tool bar member capable of connection to the hitch of a tractor;
    second pin means for pivotally connecting said tool bar member to said draft member; and
    means for selectively locking said draft member to one of said frame and said tool bar member.

3. The invention according to claim 2 wherein said selective locking means comprises:
    a first pair of hydraulic jacks pivotally connected to said tool bar member and to said draft member;
    a second pair of hydraulic jacks pivotally connected to said frame and to said draft member;
    the points of pivotal connection of said first pair of jacks to said draft member being vertically aligned with the points of pivotal connection of said second pair of jacks to said draft member; and
    means for hydraulic locking a selective one of said first and second pairs of hydraulic jacks.

4. The invention according to claim 3 and further comprising:
    a conduit interconnecting said second pair of hydraulic jacks; and
    an adjustable orifice interposed in said conduit for reducing the tendency of said trailer to fish tail during transport.

5. The invention according to claim 1 and further comprising variable orifice means interposed between each of said first and second accumulator means and the associated one of said cylinders.

6. A trailer for connection to a tractor and having a tank and an air boom comprising:
    a wheeled frame supporting the tank and the air boom;
    a tool bar member for connection to the tractor;
    a draft member;
    first pin means pivotally connecting said draft member to said tool bar member;
    second pin means pivotally connecting said draft member to said frame;
    first hydraulic jack means pivotally connected to said tool bar member and to said draft member for selectively adjusting the angular position between said draft member and said tool bar;
    second hydraulic jack means pivotally connected to said draft member and to said frame for selectively adjusting the angular position between draft member said frame; and means for selectively hydraulically locking either said first jack means to permit pivoting of said trailer relative to said tractor only about said second pin means or said second jack means to permit pivoting of said trailer relative to said tractor only about said first pin means.

7. The invention according to claim 6 wherein said second jack means comprises a first pair of hydraulic cylinders with one of said first pair being positioned on either side of said second pin means, a conduit interconnecting said pair of cylinders and a variable orifice interposed in said conduit to reduce the tendency of the trailer to fishtail during transport.

8. The invention according to claim 7 wherein said first jack means comprises a second pair of hydraulic cylinders with one of said second pair being positioned on either side of said second pin and the connections to said draft member of the cylinders of said first and second pairs on the same sides of said second pin being vertically aligned.

* * * * *